Figure 1:
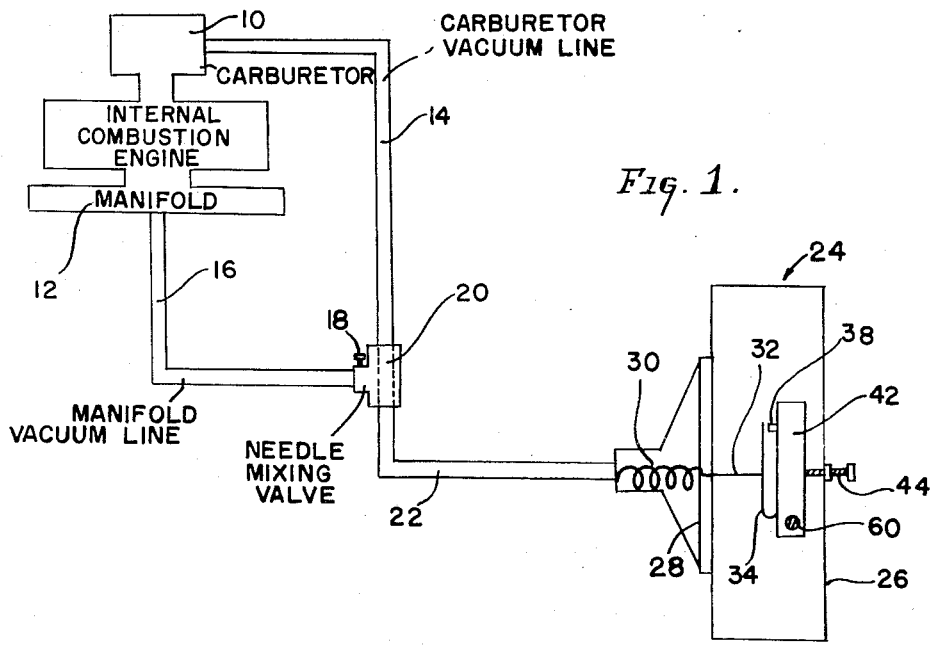

June 10, 1958   E. R. ROLLER   2,837,932
AUTOMOTIVE SUB-ATMOSPHERIC PRESSURE-ACTUATED
OVERDRIVE CONTROL AND INDICATOR SYSTEM
Filed May 25, 1954   2 Sheets-Sheet 1

INVENTOR.
EDWIN RUSSELL ROLLER
BY Alfred E. Miller
ATTORNEY

*INVENTOR.*
EDWIN RUSSELL ROLLER
BY Alfred E. Miller
ATTORNEY

United States Patent Office 2,837,932
Patented June 10, 1958

2,837,932

AUTOMOTIVE SUB-ATMOSPHERIC PRESSURE-ACTUATED OVERDRIVE CONTROL AND INDICATOR SYSTEM

Edwin Russell Roller, Putnam, Conn.

Application May 25, 1954, Serial No. 432,084

11 Claims. (Cl. 74—472)

This invention relates to a vacuum-operated variable speed ratio transmission or overdrive control and indicator system for automotive vehicles and more particularly to a vacuum responsive switch for automatically switching the transmission from overdrive into slow speed drive or torque multiplying drive.

In the conventional overdrive unit currently in use on automotive vehicles the operator must remove his foot from the accelerator pedal momentarily in order to effect a change in transmission speed ratio drive and place the vehicle in overdrive. Likewise, if the vehicle is in overdrive and the operator desires to place the vehicle in the slow speed drive the operator must depress the accelerator pedal to a predetermined position at which point a switch's contacts are made, thereby causing a solenoid to break a relay connection and also short-circuiting the ignition to the engine. The ignition will remain shorted until the transmission speed ratio drive is changed from overdrive to slow-speed drive. In the present invention the operator must let up momentarily on the pressure exerted on the accelerator in order to place the vehicle in overdrive while the change from overdrive to slow-speed drive is effected automatically without the driver exercising any conscious effort whatsoever.

There are many disadvantages to the above construction and arrangement, one being that unless the operator of an automotive vehicle remembers he may not place his vehicle in overdrive for a long period, merely because he forgot to remove his foot from the accelerator pedal. This, of course, wastes fuel. Moreover, if a vehicle is operated in overdrive on a steep grade and the operator neglects to depress the accelerator until a switch is activated so as to force the vehicle back to the slow-speed or torque-multiplying drive, then the vehicle engine is operating at a low manifold vacuum and consequently a rich fuel mixture. This condition gives poor performance since the engine is not able to develop sufficient horsepower for the work it is to accomplish. In addition, the forcing of the overdrive back to the slow-speed drive is accompanied by a jolt since the engine had previously been at full throttle opening at the time the ignition was shorted. The aforesaid is the point of zero manifold vaccum which permits an exceptionally rich and wasteful fuel mixture at this relatively slow speed.

It is an object of this invention to overcome the aforesaid disadvantages by providing a mechanism which automatically permits the transmission speed ratio drive to be changed from overdrive to slow-speed drive, this mechanism being operated by the combined vacuum produced by the manifold and the venturi of the carburetor. The action of moving from overdrive to slow-speed drive is accomplished more smoothly since this occurs at normal throttle openings instead of at full throttle. Similarly the movement of the transmission from slow-speed drive to overdrive does not occur with a jolt and accompanying loss of speed but is effected smoothly.

Thus, my invention is designed to save fuel by keeping the engine efficiency high.

It is a further object of this invention to provide an indicator system connected and integrated with the overdrive control arrangement whereby one indicator light is lit when the automotive vehicle is in overdrive and another indicator light is lit as a warning when the overdrive is about to "kick-down" to slow-speed drive and also indicates heavy motor loading. This serves to warn the driver that he cannot increase his speed if he wishes his vehicle to stay in overdrive. For the best economy the speed will drop gradually when the vehicle goes up a hill. Nevertheless, to maintain or increase speed on a steep grade requires increased torque, which is obtained automatically by the action of the present device in "kicking-down" to a slow-speed drive. Thus, an automotive operator must increase the speed of his vehicle before approaching a hill in order to have his vehicle climb the hill without increased power requirements. If the operator is on a hill and the "kick-down" warning light comes on, an increase of power output of the engine will down-shift the transmission to a slow-speed drive. However, maintaining or losing speed will allow the present device to remain in overdrive for increased economy.

It is a further object of the present invention to provide an overdrive control unit which will automatically reduce load on the engine at low R. P. M.'s and prevent the downshift of the gearing system above a predetermined engine R. P. M. of a vehicle which often occurred heretofore.

It is another object of the present invention to provide a combined overdrive control and indicator system which is simple to manufacture, easy to install and relatively inexpensive in cost. Moreover, the device embodying the present invention is effective for the purposes intended.

The above and other features, objects and advantages of the present invention will be fully understood from the following description considered in connection with the accompanying illustrative drawings.

Figure 2:
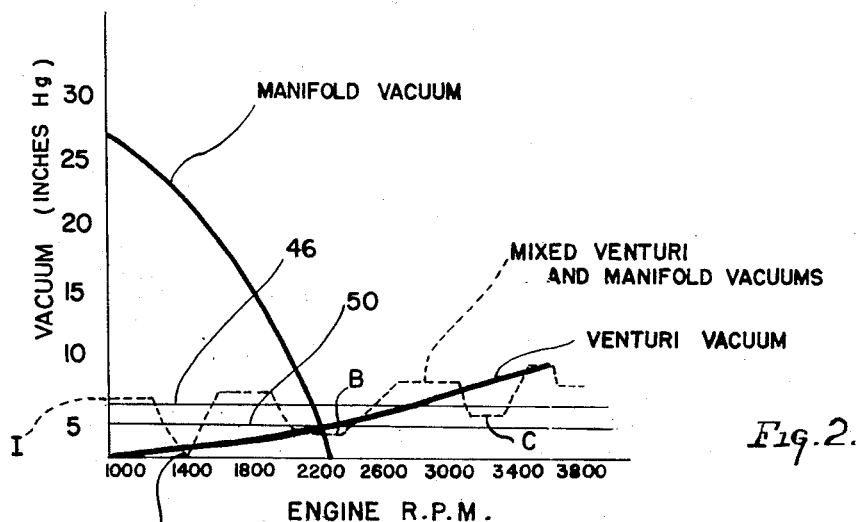
Figure 3:
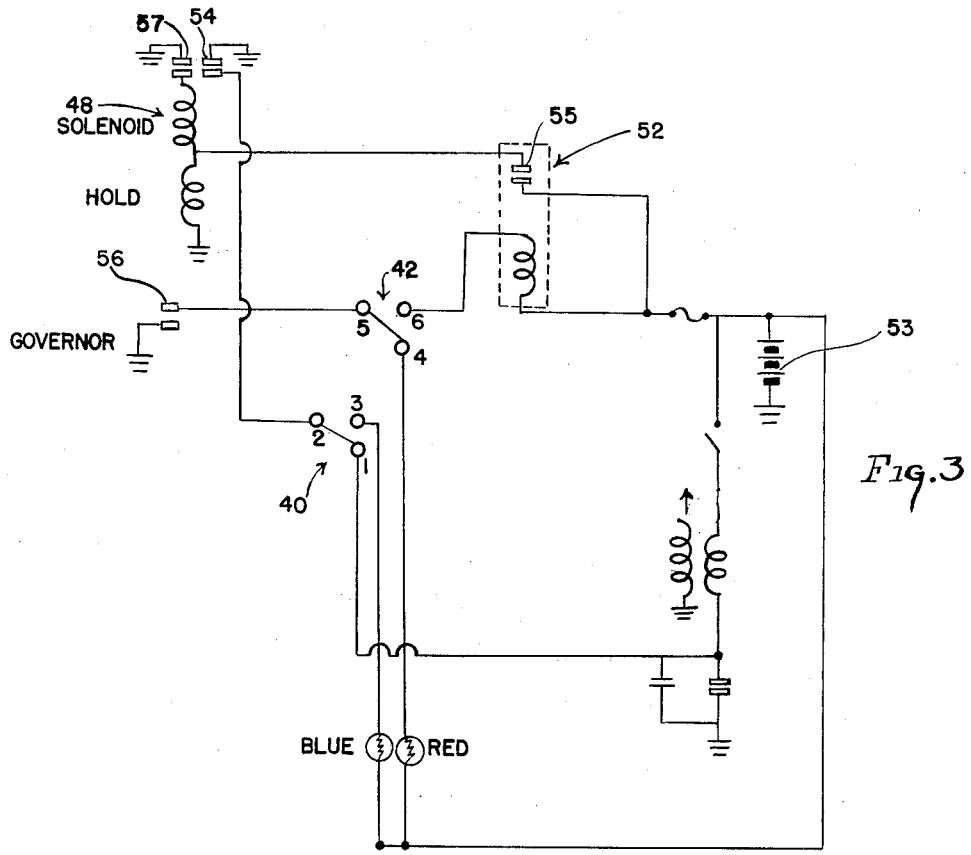
Figure 4:
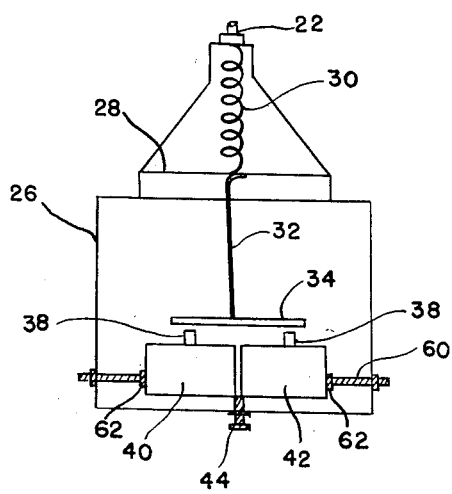

Fig. 1 is a diagrammatic view illustrating an overdrive control arrangement embodying the present invention and including a sectional view of the vacuum-operated switch employed therewith, Fig. 2 is a graphic representation of the manifold vacuum and venturi vacuum curves under different engine conditions and Fig. 3 is a schematic diagram of the overdrive control arrangement and indicator system of the present invention, Fig. 4 is a diagrammatic end view of the vacuum switch according to my invention.

Referring to the drawings and more particularly to Fig. 1, both the carburetor 10 and the manifold 12 of an automotive vehicle are provided with conduits 14 and 16 respectively which are inserted in both the carburetor and manifold in order to tap off the vacuum present therein. In the carburetor 10 the conduit 14 is so placed that it taps off part of the vacuum present in the venturi tube of the carburetor while in the manifold 12 the conduit 16 taps off a variable amount of the vacuum present therein. If the windshield wipers are vacuum operated a tap from the conduit 16 may go to the windshield wipers for operation thereof. Both conduits 14 and 16 pass through a needle mixing valve 18, however conduit 14 goes directly through the valve without any obstruction or restrictions therein as shown by the dotted lines 20 because the vacuum present in the venturi tube is of relatively low strength. On the other hand, the amount of manifold vacuum necessary to operate my device is relatively small so that the needle valve 18 may be adjustably manipulated to control the mixture of vacuums present in the main conduit 22. The main conduit 22 is secured to the vacuum-operated switch referred to generally by the numeral 24. Switch 24 comprises a housing 26, a diaphragm 28 and a spring 30 positioned between the housing and the diaphragm. Diaphragm 28 is provided with a projection 32 which engages the bent-over resilient leaf 34 on the two identical snap-action switches 40 and 42 having an off-center actuating arrangement which will be described hereinafter in greater detail. The bent-over leaf 34 operates a pair of switch actuators 38. Referring to Fig. 3 the switches 40 and 42 are in the position 1—2 and 4—5 when the motor is not running and the switch actuators 38 are engaged by resilient leaf 34. However, with the motor running, a sufficient vacuum or sub-atmospheric pressure is present on one side of the diaphragm 28 and this may, for example, be in the range of from 2 to 5 lbs., so that projection 32 is moved to left by atmospheric pressure thereby causing the resilient leaf 34 to also move to left which results in disengagement of the leaf 34 from the switch actuators 38. The switches 40 and 42 are then in the position 2—3 and 5—6 respectively as clearly seen in Fig. 3. In addition, pressure adjusting screw 44 may be screwed in or out of the housing to thereby change the amount of sub-atmospheric pressure necessary to cause the switches 40 and 42 to change operating positions. As clearly seen in Fig. 4 pressure adjusting screw 44 is threaded through housing 26 and the end of the screw 44 may be screwed to a position of abutting both switches 40 and 42 or may be withdrawn from abutting engagement with the same. If screw 44 is rotated further while abutting switches 40 and 42 both of the switches will move upwards toward resilient leaf 34 and the depressible actuators 38 are driven further into engagement with resilient leaf 34. Thus, a greater amount of vacuum is necessary in order to "pull" the resilient leaf 34 away from switch actuators 38. Conversely, if screw 44 is turned in a direction to remove the same from engagement with both switches 40 and 42 a lesser amount of vacuum is necessary to activate the switches.

As clearly seen in Fig. 4, the switches 40 and 42 are mounted in side-by-side relationship in the switch housing 26. Fig. 4 also shows the projection 32 engaging the resilient leaf 34 at a point closer to the switch 40 than the switch 42. Thus, when the vacuum or sub-atmospheric pressure developed by the engine decreases the projection 32 presses against leaf 34 to thereby cause the switch 40 to operate first. If the vacuum continues to decrease the switch 42 will be actuated. In this regard, the vacuum necessary to operate switch 42 is illustrated in Fig. 2 as line 46, while the vacuum required to actuate switch 40 is designated as line 50. To adjust the individual value of the vacuum necessary to operate each of the switches 40 and 42 and consequently the amount of engine loading at which the aforesaid switches will become operative, a threaded rod 60 is provided in the switch housing 26 and passes through both switches 40 and 42. The switches 40 and 42 may be moved laterally in switch housing 26 and locked in a desired position with locking nuts 62. Movement of the switches to the right on rod 60 will decrease the spacing between lines 46 and 50 and movement to the left will increase the spacing between these lines. As stated before, the movement of the pressure adjusting screw 44 changes the relative amount of vacuum necessary for actuation of the switches 40 and 42. Thus, as stated hereinbefore, the movement of the pressure adjusting screw 44 varies the pressure on spring 30 which in turn changes the amount of vacuum required for movement of diaphragm 28 to actuate switches 40 and 42. If less vacuum is necessary to operate the switches, the lines 46 and 50 on the graph of Fig. 2 are lowered. This condition will cause the switch to operate only at heavier engine loads or alternatively one or both switches will not operate at all.

Referring more particularly to the curves shown in Fig. 2 in which the abscissa of the graph is engine R. P. M. under average load and the ordinate is vacuum in inches of mercury, the manifold vacuum starts off very high and drops off rapidly as the engine load increases while the venturi vacuum is initially zero and increases in a gradual slope as the engine R. P. M. increases. The dotted line represents a mixture of manifold vacuum and venturi vacuum in conduit 22, upper levels representing light engine loading and lower levels indicating heavy engine loading. Line 46 is the point of actuation or of make and break of solenoid switch 48, for at this point switch 42 contacts operate. Line 50 is the point of actuation or of ignition shorting due to the action of switch 40 and its associated wiring. The needle mixing valve 20 is adjusted for point I with an idling engine.

In regard to Fig. 2 the manifold vacuum always drops to zero with heavy engine loading, however this loading does not occur necessarily at full throttle, for it also occurs readily at slow engine speeds as seen at point A of Fig. 2 in which the transmission has shifted from overdrive to slow-speed drive. Point B is medium engine speed, however zero or very low manifold vacuum mixed with the venturi vacuum which has not increased considerably still permits a shift from overdrive to slow-speed operation. Point C occurs at high engine speed under load. At this point even though the manifold vacuum has dropped to zero the venturi vacuum has become great enough to stop the action of the ignition short switch and the vehicle will stay in overdrive under all conditions thereby avoiding the 43% increase in engine R. P. M. that would occur if the kickdown action were to take place.

Referring now to Fig. 3 wherein is illustrated the schematic diagram of the overdrive control arrangement, the switches 40 and 42 are shown in the position 1—2, 4—5, which is the normal position with the engine not in operation. With the vehicle stopped the overdrive is not engaged so the ignition short contacts 54 are open. The engine as it is operated creates a vacuum whereupon switches 40 and 42 assume positions 2—3 and 5—6. At a predetermined point, for example, 27 miles per hour, the governor contacts 56 close. Above this speed the driver must momentarily lift his foot from the accelerator in order that the automotive gears can engage in overdrive. This action relieves the load from the gears and the solenoid winding, as will be explained hereinafter, changes gears. Thus, switch 42 in the position 5—6 and contacts 56 of the governor being closed, a complete circuit is made through the battery 53. The relay 52 is energized by current flowing from the battery 53 and contacts 55 are closed and the center-tapped winding 48 is energized. A surge of current then traverses the winding 48 activating the solenoid as well as the hold windings. The contacts 57 are closed completing the circuit through ground. The transmission may now shift into overdrive when the driver relieves the gear loading. Accordingly, while the overdrive gearing is not engaged contacts 57 are closed to provide current in the solenoid part of winding 48 to thereby shift into overdrive. Therefore, the solenoid power shifts the gears of the vehicle into overdrive at which time the contacts 57 open. However, the hold section of winding 48 maintains sufficient pressure on the gears to hold them engaged. At the completion of the shift into overdrive contacts 54 close. It is apparent that the solenoid power thus shifts the gears of the automotive vehicle into overdrive and the solenoid contacts 57 open at the completion of the shift while contacts 54 close. Accordingly, when ignition short contacts 54 close on the completion of the gear change, current flows through contacts 2—3 which are made to the blue indicator light. Thus, the blue indicator light is on instructing the driver that the vehicle is in overdrive. Moreover, the hold coil remains energized thereby keeping the gears in overdrive without any dependence on gear loading. However, if the vehicle speed drops lower than 21 miles per hour governor contacts 56 open and energy to the hold coil is removed and downshift occurs and the blue light goes out since contacts 54 are opened.

Automatic downshifting from overdrive to slow speed drive will occur with the following sequence. At the desired engine loading, the mixed vacuum drops to line 46 whereupon switch 42 changes position from 5—6 to 5—4, thereby lighting the red indicator from the battery through contacts 56 to ground. This indicates the particular load to the driver who may continue to maintain this load if he desires with consequent increase or decrease of road speed depending upon the road level, car weight, etc. However, if the driver requires increased load, the mixed vacuum will further drop to line 50 whereupon switch 40 contacts change position from 2—3 to 2—1 completing the circuit to ground through 54 to short the ignition. The downshifting occurs rapidly with contacts 54 opening at the completion of the shift to restore engine power. The blue overdrive indicator goes out at the same time. In slow speed drive the red load indicator light will continue to function as long as the governor contacts 56 are closed.

It is to be noted that downshifting may be prevented above a desired engine speed because of the mixed venturi and manifold vacuum characteristic. Point C of Fig. 2 shows the lower limit of the mixed vacuum being above line 50, thus switch 40 cannot be actuated therefore preventing down-shifting of the engine under any conditions. Until the engine speed and consequent road speed is lowered to approximately 2700 R. P. M., for example, the lower limit of the dotted line will not fall on or below line 50 in order that down-shifting may occur.

It should be noted that the adjustment of screw 44 will set the position of the switch operation lines 46 and 50 simultaneously at a higher or lower vacuum reading depending in which direction the screw 44 is turned. Adjustment of the switches laterally on rod 60 will close or separate the switch operation lines 46 and 50 thereby permitting a variation in the degree of warning that downshifting will occur if increased engine loading is desired. The above-described adjustments are within the contemplated scope of my invention.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A control for an overdrive unit of the type suitable for use with an automotive engine, said engine being provided with a carburetor and a manifold, comprising means for tapping off the sub-atmospheric pressure present in said manifold, means for tapping off the sub-atmospheric pressure present in said carburetor, means for mixing both said sub-atmospheric pressures, at least two switches, a housing for said switches and means for supplying said mixed sub-atmospheric pressures to said switch housing, an electrical circuit including a solenoid winding, an electric current source, said switches being operated sequentially by a predetermined amount of said mixed sub-atmospheric pressures in said housing to thereby complete said electrical circuit and furnish said current to said solenoid winding whereby said overdrive unit is made operative.

2. A control for an overdrive unit of the type suitable for use with an automotive engine, said engine being provided with a carburetor and a manifold, comprising means for tapping off the sub-atmospheric pressure present in said manifold, means for tapping off the sub-atmospheric pressure present in said carburetor, a needle valve for mixing both said sub-atmospheric pressures, at least two switches adapted to be activated by a predetermined amount of said mixed sub-atmospheric pressures, a housing for said switches, and means for supplying said mixed sub-atmospheric pressures to said switch housing, an electrical circuit including a solenoid winding, an electric current source, and means positioned closer to one switch than the other switch for actuating said one switch before said other switch, said switches being operated sequentially by a predetermined amount of said mixed sub-atmospheric pressures in said housing to thereby complete said electrical circuit and furnish said current to said solenoid winding whereby said overdrive unit is made operative.

3. A control for an overdrive unit of the type suitable for use with an automotive engine, said engine being provided with a carburetor and a manifold, comprising means for tapping off the sub-atmospheric pressure present in said manifold, means for tapping off the sub-atmospheric pressure present in said carburetor, means for mixing both said sub-atmospheric pressures, at least two switches, a housing for said switches, means for supplying said mixed sub-atmospheric pressures to said switch housing, an electrical circuit including a solenoid winding, an electric current source, said switches being operated sequentially by a predetermined amount of said mixed sub-atmospheric pressures in said housing to thereby complete said electrical circuit and furnish said current to said solenoid winding whereby said overdrive unit is made operative, and means for adjusting said switches laterally in said housing to thereby change the time interval between the actuation of said two switches.

4. A control for an overdrive unit of the type suitable for use with an automotive engine, said engine being provided with a carburetor and a manifold, comprising means for tapping off the sub-atmospheric pressure present in said manifold, means for tapping off the sub-atmospheric pressure present in said carburetor, means for mixing both said sub-atmospheric pressures, at least two switches, a housing for said switches, means for supplying said mixed sub-atmospheric pressures to said switch housing, an electrical circuit including a solenoid winding, an electric current source, said switches being operated sequentially by a predetermined amount of said mixed sub-atmospheric pressures in said housing to thereby complete said electrical circuit and furnish said current to said solenoid winding whereby said overdrive unit is made operative, and means for moving said switches linearly in said housing whereby the amount of sub-atmospheric pressure necessary to actuate said switches is varied.

5. A control for an overdrive unit of the type suitable for use with an automotive engine, said engine being provided with a carburetor and a manifold, comprising means for tapping off the sub-atmospheric pressure present in said manifold, means for tapping off the sub-atmospheric pressure present in said carburetor, means for mixing both said sub-atmospheric pressures, at least two switches, a housing for said switches, means for supplying said mixed sub-atmospheric pressures to said switch housing, an electrical circuit including a solenoid winding, an electric current source, said switches being operated sequentially by a predetermined amount of said mixed sub-atmospheric pressures in said housing to thereby complete said electrical circuit and furnish said current to said solenoid winding whereby said overdrive unit is made operative, and indicator means operatively connected to said switches for indicating when said engine is in overdrive and when said engine is being placed in a relatively slow-speed drive.

6. A control for an overdrive unit of the type suitable for use with an automotive engine, said engine being provided with a carburetor and a manifold comprising means for tapping-off the sub-atmospheric pressure in said manifold, means for tapping-off the sub-atmospheric pressure in said carburetor, means for mixing both said sub-atmospheric pressures, at least two switches each being provided with a switch actuator, a switch housing for said switches, a resilient member secured to at least one of said switches and normally holding each of said switch actuators in a predetermined position, means for supplying said mixed sub-atmospheric pressures to said switch housing, an electrical circuit including a solenoid winding, an electric current source, and said switch actuators being operated sequentially by a predetermined amount of said mixed sub-atmospheric pressures in said housing to thereby complete said electrical circuit and furnish said current to said solenoid winding whereby said overdrive unit is made operative.

7. A control for an overdrive unit of the type suitable for use with an automotive engine, said engine being provided with a carburetor and a manifold comprising means for tapping-off the sub-atmospheric pressure in said manifold, means for tapping-off the sub-atmospheric pressure in said carburetor, means for mixing both said sub-atmospheric pressures, at least two switches each being provided with a switch actuator, a switch housing for said switches, a resilient member secured to at least one of said switches and normally holding each of said switch actuators in a predetermined position, means for supplying said mixed sub-atmospheric pressures to said switch housing, an electrical circuit including a solenoid winding, an electric current source, said switch actuators being operated sequentially to other positions upon the provision of a predetermined amount of said mixed sub-atmospheric pressures in said housing, to thereby complete said electrical circuit and furnish said current to said solenoid winding whereby said overdrive unit is made operative, and indicator means including two lamps which are operatively connected to said switches, one of said lamps being adapted to indicate when said engine is in overdrive and the other of said lamps being adapted to indicate when said engine is being placed in a relatively slow-speed drive.

8. A control for an overdrive unit of the type suitable for use with an automotive engine, said engine being provided with a carburetor and a manifold comprising a first conduit means for tapping-off the sub-atmospheric pressure present in said manifold, a second conduit means for tapping-off the sub-atmospheric pressure present in said carburetor, a needle mixing valve communicating with both said conduit means wherein only the amount of sub-atmospheric pressure admitted from said first conduit into said mixing valve may be varied, at least two switches, a housing for said switches, and means for supplying said mixed sub-atmospheric pressures to said switch housing, an electrical circuit including a solenoid winding, an electric current source, said switches being operated sequentially by a predetermined amount of said mixed sub-atmospheric pressures in said housing to thereby complete said electrical circuit and furnish said current to said solenoid winding whereby said overdrive unit is made operative.

9. A control for an overdrive unit of the type suitable for use with an automotive engine, said engine being provided with a carburetor and a manifold comprising means for tapping-off the sub-atmospheric pressure in said manifold, means for tapping-off the sub-atmospheric pressure in said carburetor, means for mixing both said sub-atmospheric pressures, at least two switches each being provided with a switch actuator, a switch housing for said switches, a resilient member secured to at least one of said switches and normally holding each of said switch actuators in a predetermined position, means for supplying said mixed sub-atmospheric pressures to said switch housing, an electrical circuit including a solenoid winding, an electric current source, said switch actuators being operated sequentially to other positions upon the provision of a predetermined amount of said mixed sub-atmospheric pressures in said housing, to thereby complete said electrical circuit and furnish said current to said solenoid winding whereby said overdrive unit is made operative, and screw means engaging said switches for moving said switches laterally in said housing to thereby change the time interval between the actuation of said two switches.

10. A control for an overdrive unit of the type suitable for use with an automotive engine, said engine being provided with a carburetor and a manifold comprising means for tapping-off the sub-atmospheric pressure in said manifold, means for tapping-off the sub-atmospheric pressure in said carburetor, means for mixing both said sub-atmospheric pressures, at least two switches each being provided with a switch actuator, a switch housing for said switches, a resilient member secured to at least one of said switches and normally holding each of said switch actuators in a predetermined position, means for supplying said mixed sub-atmospheric pressures to said switch housing, an electrical circuit including a solenoid winding, an electric current source, said switch actuators being operated sequentially to other positions upon the provision of a predetermined amount of said mixed sub-atmospheric pressures in said housing, to thereby complete said electrical circuit and furnish said current to said solenoid winding whereby said overdrive unit is made operative, and screw means engaging said switches for moving the same linearly in said housing whereby the amount of sub-atmospheric pressure necessary to actuate said switches is varied.

11. A control for an overdrive unit of the type suitable for use with an automotive engine, said engine being provided with a carburetor and a manifold, comprising means for tapping off the sub-atmospheric pressure present in said manifold, means for tapping off the sub-atmospheric pressure present in said carburetor, a mixing valve for mixing both said sub-atmospheric pressures, a switch housing, first means for supplying said mixed sub-atmospheric pressures to said switch housing, an electrical circuit including a solenoid winding, two switches in said housing, an electric circuit source, second means for effecting a relatively slow speed drive of said automotive engine, and said switches being operated sequentially by a predetermined amount of said mixed sub-atmospheric pressures in said housing to thereby complete said electrical circuit and furnish said current to said solenoid winding whereby said overdrive unit is made operative.

References Cited in the file of this patent

UNITED STATES PATENTS

| | | |
|---|---|---|
| 2,242,519 | Frank | May 20, 1941 |
| 2,257,674 | Dunn | Sept. 30, 1941 |
| 2,317,029 | Claytor | Apr. 20, 1943 |
| 2,362,655 | Mallory | Nov. 14, 1944 |
| 2,364,774 | Boyce | Dec. 12, 1944 |
| 2,366,253 | Griswold | Jan. 2, 1945 |
| 2,377,256 | Mallory | May 29, 1945 |
| 2,380,491 | Ball | July 31, 1945 |
| 2,548,138 | Ball | Apr. 10, 1951 |
| 2,753,732 | Harrison | July 10, 1956 |